United States Patent Office

3,253,058
Patented May 24, 1966

3,253,058
PROCESS FOR PREPARING FILM-FORMING POLYMERS OF OLEFINICALLY-UNSATURATED NITRILES AND POLYALKENYL COMPOUNDS AND PRODUCTS THEREOF
Ralph E. Isley, Northfield, and Richard C. Adams, Chardon, Ohio, assignors to The Standard Oil Company, Cleveland, Ohio, a corporation of Ohio
No Drawing. Filed Mar. 14, 1963, Ser. No. 265,081
19 Claims. (Cl. 260—881)

The present invention relates to novel film-forming polymers of alpha, beta-olefinically unsaturated nitriles and more particularly pertains to novel film and fiberforming copolymers of an alpha, beta-olefinically unsaturated nitrile monomer component and a polyalkenyl monomer component.

The copolymerization of an alpha, beta-mono-olefinically unsaturated nitrile monomer, such as acrylonitrile, with a polyalkenyl monomer or a cross-linking agent, such as divinyl benzene, methylene-bis-acrylamide, ethylene diacrylate, ethylene dimethacrylate, diallyl phthalate, allyl allyloxyacetate, diallyl cyanamide, tetraallyl silane, tetrovinyl tin, tetraallyl lead, polyallyl sucrose, polyallyl pentaerythritol, and the like to form insoluble or gelled interpolymers is disclosed in U.S. Patents Nos. 2,991,276; 2,978,421; 2,912,418; 2,783,212; 2,550,652; 2,475,846 and 2,437,508.

It is also well known that nitrile polymers, such as polyacrylonitrile, and high acrylonitrile copolymers which are useful in the preparation of fibers must possess high enough molecular weights to impart the desired physical properties to the fiber and they must be in the molecular weight range which permits the formation of relatively high solids solutions or spinning dopes. The critical nature of the polymer molecular weight, molecular weight distribution and solution solids insofar as the dry spinning of polyacrylonitrile fibers is concerned is disclosed in U.S. Patent No. 2,628,223.

In acrylonitrile polymer fiber technology, it is well-established that the spinability of a polymer solution naturally depends upon the uniformity of the polymer from the standpoint of molecular weight distribution and structure, and cross-linking of any type is to be avoided because any gel which might be present in the spinning dopes would cause plugging of the openings in the spinneret. See, for instance, U.S. Patents Nos. 2,537,030, 2,628,223, 2,629,712, 2,725,370, 2,743,263 and 2,777,-732. In other words, the art discloses that for good spinnability, the acrylonitrile polymer should be substantially linear because branching in the polymer chain affects the solution characteristics of the polymer and the way in which a concentrated solution of the polymer passes through a small orifice as in a spinneret.

In the art dealing with acrylonitrile polymer fiber technology there often appears disclosure that in addition to fibers, other shaped articles, such as films may also be prepared using the same or similar procedures. This type of disclosure appears, for instance, in U.S. Patents Nos. 2,846,423, 2,696,478, 2,558,780, 2,445,042, 2,436,-926, 2,404,728, 2,404,713, 2,140,921, 2,140,048 and and 2,117,210.

Oriented fibers or filaments produced by drawing freshly extruded filaments of acrylonitrile polymers under a variety of drawing conditions have been known to the art for some time and have enjoyed great commercial success in the textile field. However, attempts to manufacture polyacrylonitrile films by the known techniques, and thus utilize in film form the potentially advantageous properties of acrylonitrile polymers, have not met with much success.

It is also well known to those skilled in the art that polyacrylonitrile films heretofore known have been extremely brittle and difficult to handle or to orient because the extreme tendency of polyacrylonitrile films stretched in one direction to fibrillate.

Studies relating to the molecular structure of films and filaments formed from acrylonitrile polymers have revealed a fundamental difference between the behavior of films from this polymer and other types of polymeric films which can be readily stretched in two mutually perpendicular directions in an essentially dry state at normal or somewhat elevated temperatures. The difficulty in stretching polyacrylonitrile films in two mutually perpendicular directions arises because the polymer chains tend to pack into fibrils. Hence, the film readily stretches in one direction to form a film having a fibrillar structure, and it fibrillates when attempts are made to stretch the film in a direction perpendicular to the first direction of stretch.

Recently, there has appeared in the patent literature a technique for orienting rubbery "coalesced films" of polyacrylonitrile containing from 30 to 90% of a liquid or liquid mixture which are prepared by special critical procedures as more fully disclosed in British Patents Nos. 887,008, 863,425 and in U.S. Patent No. 2,056,676.

It is an object of the present invention, therefore, to provide a novel copolymer of an alpha, beta-olefinically unsaturated nitrile monomer which will dissolve readily in volatile solvents to form solutions from which useful films may be cast. Another object is the provision of novel copolymers of the foregoing type which will form relatively high solids content solutions in volatile solvents. Yet another object is the provision of useful flexible films which do not embrittle upon aging and can be oriented in one or more directions from the foregoing copolymer.

That the foregoing and other objects have been accomplished will become apparent to those skilled in the art from the following description and illustrative examples.

The novel copolymers of the present invention are those resulting from the copolymerization of (1) at least one alpha, beta-monoolefinically unsaturated nitrile monomer having from 3 to 4 carbon atoms and a terminal $CH_2=C<$ group and (2) at least one polyalkenyl monomer copolymerizable with (1).

It is preferred that the copolymers embodied herein be the polymerization product of about 100 parts by weight of the alpha, beta-monoolefinically unsaturated nitrile monomer component and from 5 to 0.05 part by weight of the polyalkenyl monomer component. It is also contemplated to be within the scope of the present invention to replace up to 5% by weight of the alpha, beta-monoolefinically unsaturated nitrile with one or more polymerizable monoalkenyl monomers such as those known in the art for imparting dyeability to acrylonitrile fiber polymers. Useful comonomers include those disclosed in U.S. Patents Nos. 3,073,669, 3,003,993, 2,696,478 and 2,436,926 and British Patent No. 863,425. More preferred are the copolymers of about 100 parts by weight of the alpha, beta-monoolefinically unsaturated nitrile component and from 3 to 0.1 part of the polyalkenyl monomer component.

The alpha, beta-monoolefinically unsaturated nitrile monomers useful herein include acrylonitrile, methacrylonitrile, alpha-chloroacrylonitrile, crotononitrile, vinylidene cyanide and the like. The preferred nitrile monomers are acrylonitrile and methacrylonitrile and most preferred in the present invention is acrylonitrile.

The polyalkenyl monomers embodied herein must contain at least two polymerizable alkenyl groups and preferably at least two $CH_2=C<$ groups per molecule separated by at least one other group. Such materials include Allyl acrylate,
Allyl methacrylate,
Diallyl maleate,
Diallyl fumarate,
Ethylene glycol dimaleate,
Diallyl itaconate,
Methallyl acrylate,
Divinyl ether,
Diallyl ether,
Dimethallyl ether,
Ethylene glycol dimethacrylate,
1,1,1-trimethoxypropanedimethacrylate,
Glyceryl triacrylate,
Sucrose hexaacrylate,
Diallyl phthalate,
Triallyl cyanurate,
2,2,5,5-tetramethyl-1,5-hexadiene,
1,5-hexadiene,
1,6-heptadiene,
1,7-octadiene,
1,8-nonadiene,
Divinyl biphenyl,
Divinyl naphthalene,
Divinyl benzene,
Trivinyl benzene,
Diallyl benzene,
Diisopropenyl benzene,
Allyl allyloxyacetate,
Ethylidene dimethacrylate,
Methylene dimethacrylate,
Diallyl melamine,
Diallyl isomelamine,
Triallyl melamine,
Triallyl aconitate,
Triallyl phosphate,
Tetraallyl silane,
Tetravinyl silane,
Diallyl vinyl silane,
Tetraallyl germane,
Tetravinyl tin,
Tetravinyl germane,
Triacryloyl perhydrotriazine,
Trimethacryloyl perhydrotriazine,
Divinyl spirobi,
Methylene-bis-acrylamide,
Ethylene diacrylamide,
N-allyl acrylamide,
N,N-diallyl acrylamide,
N,N-dimethallyl methacrylamide,
Polyallyl ethers of polyhydric alcohols, such as
Tetraallyl pentaerythritol,
Hexaallyl sucrose,
Hexaallyl inositol,
Hexaallyl sorbitol,
Hexavinyl sucrose, and the like and other types more fully disclosed in U.S. Patents Nos. 3,050,496, 2,991,276, 2,978,421, 2,716,418, 2,783,212 2,712,004, 2,550,652, 2,475,846, 2,437,508, 2,341,334 and 2,273,891 and Canadian Patent No. 651,654.

The film-forming and fiber-forming copolymers embodied herein may be prepared in any conventional manner, such as by batch, bulk, solution, or suspension polymerization techniques, all of which are well known in the art. For best results, however, it is preferred that the copolymers be prepared in an aqueous medium in the presence of a so-called redox catalyst composed of a water soluble peroxygen compound and an oxidizable sulphur compound as promoter, as more fully disclosed, for instance, in U.S. Patent No. 2,486,241. It is most preferred for best film properties that the copolymers of the present invention be prepared in two steps, the first step sometimes referred to herein as the "seed step" comprising the copolymerization of a portion of the alpha, beta-olefinically unsaturated nitrile and all of the polyalkenyl monomer to high conversion and the second step comprising polymerizing the remainder of the nitrile monomer onto or in the presence of the polymer "seed" thus formed in the first step. The second or "main polymerization step" may be carried out by adding all of the nitrile monomer to the seed polymer at once or in increments or in a continuous manner. A suitable emulsifier, surface-active agent, or dispersing agent may be used throughout both the seed step and the main polymerization step of the polymerization procedure in the preparation of the film-forming copolymers of this invention.

In a representative polymerization procedure an aqueous medium containing about 0.1 to 2% of a perdisulfate salt, about 0.05 to 0.5% of a polymerization adjuvant, such as sodium bisulfite, and about 1 to 5% of a suitable emulsifier or dispersing agent is placed in an appropriate vessel which is provided with a means of agitation, such as stirring or shaking. This is followed by the addition of the seed step monomer mixture comprising all of the polyalkenyl monomer and part of the nitrile monomer. The air in the free space of the vessel is displaced by an inert gas such as nitrogen. The mixture is, thereafter, heated at a constant temperature in the range of from 30 to 100° C. with continuous or intermittent agitation until polymerization has proceeded to the desired extent, i.e., until substantially all of the monomer is converted to polymer. Next the remainder of the nitrile monomer is added gradually and the polymerization is carried out to high conversion (70–100%). All of the polyalkenyl monomer is always added to the seed step monomer mixture and only part of the nitrile monomer component is added in the seed step; preferably no more than half the nitrile monomer component and more preferably no more than 30% by weight of the total nitrile monomer component is used in the seed step.

The peroxygen compounds useful in the aforementioned redox catalyst system embodied herein include oxygen-liberating substances in general, and especially the water-soluble salts of perdisulfuric acid, such as the ammonium, sodium, potassium, lithium, barium, magnesium, and calcium persulfates. Other oxygen-liberating substances which may be used include benzoyl peroxide, acetyl peroxide, hydrogen peroxide, and peracetic acid. The concentration of peroxygen compound employed may be varied within wide limits. For instance, amounts of persulfate varying from 0.05 to 10% of the quantity of monomers employed are operable and generally amounts of from 0.1 to about 3% by weight are preferred as a practical matter.

The polymerization promoters include oxygen-containing sulfur compounds capable of undergoing oxidation, such as sodium bisulfite, sulfur dioxide, sodium hydrosulfite, sodium thiosulfate, diethyl sulfite, formamidine sulfinic acid, and para-toluene sulfinic acid. Amounts of the promoters varying from 0.001% to 5% of the quantity of monomer employed are operable.

The addition of the catalyst to the reaction mixture is frequently attended by a marked increase in temperature and care must be taken to remove the excess heat generated in such cases. The total quantity of catalyst components may be added initially to the reaction mixture or in small proportions during the course of the polymerization. The latter method affords a convenient procedure for regulating the amount of heat produced in a given time. Less preferred polymerization initiators include the azo catalysts such as azodiisobutyronitrile, and radiant energy such as ultra violet light, nuclear radiation and X-rays.

Surface-active agents or emulsifiers are frequently divided into four clases depending on which portion of the molecule contains the active group. These four classes are the following: Anionic (such as soaps), cationic (such as cetyl pyridinium bromide), hybrid (cationic-anionic, such as betaine-type compounds), and non-ionic (such as the products obtained in the reaction of long-chain alcohols with ethylene oxide). Any of these types of dispersing agents or emulsifiers may be used in the emulsion polymerization according to the present invention provided they are not decomposed under the conditions employed. Suitable agents include sodium dodecyl sulfate, sodium hexadecyl sulfate, sodium tetradecyl sulfate, sodium octadecyl sulfate, sodium octadecenyl sulfate, sodium acetoxyoctadecane sulfate, sodium tetradecane - 1 - sulfonate, sodium octadecane - 1 - sulfonate, sodium alkylnaphthalene sulfonates, C-cetyl betaine, hydroxypropyl C-cetyl betaine, dodecyl triethyl ammonium bromide, stearyl trimethylammonium bromide, the diethyl cyclohexylamine salt of hexadecyl sulfuric ester, partially saponified polyvinyl acetate, the sodium salt of methacrylic acid-methyl methacrylate copolymer, the phosphate ester emulsifying agents of the types

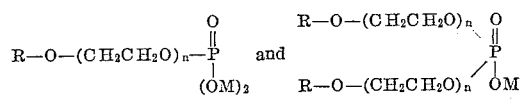

wherein R is a hydrocarbon group having from 8 to 27 carbon atoms, M is hydrogen, ammonium, potassium or sodium and $n$ is the number of ethylene oxide units required of a water number of at least 18 as more fully disclosed in U.S. Patent No. 2,853,471, and the like. When surface-active agents or dispersing agents are used, it is preferred that they be used in concentrations of from 0.2 to 5% based on the weight of the aqueous medium in which the polymerization is carried out. In the aqueous emulsion or dispersion polymerization, the ratio of the aqueous to the non-aqueous phase may vary between approximately 10:1 to 1:1. In general, it is preferred to employ aqueous/non-aqueous-ratios between approximately 4:1 to 1:1 since, for a given reaction vessel, the time-space yield is greatly reduced by the use of higher ratios.

The polymerization may be carried out in alkaline, acid, or neutral media. However, it is preferred to operate in an aqueous medium whose pH may vary from about 2 to about 8, since this range appears to enhance the polymerization of acrylonitrile. If it is desired to avoid pH changes during the course of the polymerization, suitable buffers may be added to the aqueous polymerization medium.

As is well known, the dependence of the ratio of vinyl polymerization upon the temperature is very important, and low temperatures generally cannot be used because the corresponding rate of reaction is impractically low. The polymerization reaction can be carried out at any temperature above the freezing point of the aqueous phase, which is somewhat below 0° up to 100° C. or higher.

While acrylonitrile is not as susceptible to the inhibiting effect of oxygen as are many other polymerizable compounds, it is nevertheless, advantageous to conduct the polymerization in the absence of air. The air may be displaced from the polymerization vessel by means of an inert gas which does not reduce the rate of polymerization. Suitable illustrative gases therefore are well known in the art and include nitrogen, carbon dioxide, methane and heluim, and the like.

At the conclusion of the polymerization, the products of this invention may be isolated as finely divided powders by a variety of methods. For example, the dispersion may be sprayed into a heated and/or evacuated chamber whereby the water is removed as vapor and the polymer falls to the bottom of the chamber. When the polymer is prepared in sufficiently high solids, i.e., 15% or higher, it often can be isolated as a fine granular powder simply by filtration or centrifugation. The polymer may also be isolated by cooling the dispersion below the freezing point of the aqueous medium or by the addition of a large volume of a lower aliphatic alcohol such as methanol or ethanol. A satisfactory procedure consists in adding an appropriate amount of an electrolyte solution to the diluted aqueous dispersion with rapid agitation at a temperature just below the point at which the precipitated particles tend to adhere. This procedure yields a polymer in the form of dense, granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the copolymer, it is filtered and washed repeatedly with water to remove traces of electrolyte and dispersing agent which may adhere to the particles. Washing with dilute solutions of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol, such as methanol or ethanol.

Because polyacrylonitrile has a very high softening temperature coupled with a serious thermal degradation problem, preparation of film therefrom would appear to be possible only through some form of solvent or dispersion casting. Copolymer solutions suitable for casting of films or the wet or dry spinning of fibers may be prepared by dissolving from about 10 to 30% by weight of the copolymer in one or a combination of volatile polar solvents, such as dimethyl formamide, dimethyl thioformamide, N-methyl-beta-cyano-ethyl formamide, alpha-cyano acetamide, N-methyl pyrrolidone, gamma-butyrolactone, ethylene carbonate, tetramethyl oxamide, epsilon-cyanolactam, 1,3,3,5-tetracyanopentane, dimethyl cyanamide, dimethyl methoxy acetamide, N-formyl morpholine, N-formyl hexamethylene imine, dimethyl sulfoxide, propiolactone, N,N-dimethyl acetamide, dimethyl sulfone, tetramethylene cyclic sulfone, ethylene cyanhydrin, nitromethane, acetonitrile, malonitrile, tris-dimethylaminophosphine oxide, N,N'-tetramethylmethanephosphonamide, etc., to form a high solids, pourable solution.

Examples of less preferred aqueous solvent systems for the copolymers of this invention are concentrated aqueous solutions of water-soluble inorganic salts, more particularly such salts which yield highly hydrated ions in aqueous solution, e.g., the chlorides, bromides, iodides, thiocyanates, perchlorates, and nitrates, which salts are disclosed in U.S. Patent No. 2,140,921. More specific examples of water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono- (lower alkyl) substituted guanidine thiocyanates, and the symmetrical and unsymmetrical di- (lower alkyl) substituted guanidine thiocyanates.

Well known or special techniques for dissolution of the copolymer in a solvent or mixture of solvents, such as those disclosed in U.S. Patents Nos. 2,404,713 and 2,404,728 may be employed.

If desirable, lubricants, dyes, bleaching agents, plasticizers or pseudo-plasticizers and anti-static agents may be incorporated into the polymer solution embodied herein or the final films or fibers prepared therefrom may be after-treated with same.

Stabilizers which may be included in the films or fibers of the copolymers embodied herein include the phosphorus-containing polyphenolic compounds more fully disclosed in U.S. Patent No. 2,931,696; the polyphenolic alkane compounds more fully disclosed in U.S. Patent No. 2,931,697; hydrofluoboric acid and water-soluble salts thereof as more fully disclosed in U.S. Patent No. 2,846,423; ethylene diamine tetraacetic acid and similar compounds as more fully disclosed in U.S. Patent No. 3,003,993; manganese salts as more fully disclosed in U.S. Patent No. 2,661,346; certain amine salts as more fully disclosed in U.S. Patent No. 2,835,647; and the adjuvants more fully disclosed in U.S. Patent No. 2,748,097.

It has been found that linear polyacrylonitrile of moderate molecular weight forms solution cast films which embrittle rapidly on aging. In order to obtain good aging properties in acrylonitrile homopolymer films, molecular weights of on the order of 500,000 to one million are necessary, and at these levels, processing into films by solvent casting is uneconomical because even 5% solids solutions of such homopolymers are barely pourable under precessing conditions. Very high molecular weight linear polynitrile materials must be cast from as low as 2½ to 5% by weight solids solutions. This requires removal of large amounts of solvent which would greatly reduce production on commercial equipment. It was found, for instance, that when a linear homopolymer of acrylonitrile having a molecular weight of 228,000 was cast into a film and aged at 60° C. for 18 hours the resulting film was too brittle to test. This was not a residual solvent effect. In contrast, a "seeded" polymer of the type embodied herein of 99.5 acrylonitrile-0.5 tetramethylene diacrylate composition, for instance, prepared having a molecular weight of 100,000 was found to yield a solvent cast film with excellent physical and aging properties.

Films can be cast from solutions of the copolymers embodied herein by sheet-casting techniques which involve depositing a uniform film of the solution on a smooth, flat surface and removing the solvent from the film by volatilization. Films resulting from this procedure wherein copolymers of the present invention are employed are flexible and of excellent physical properties and may be oriented by stretching in one or two mutually perpendicular directions.

In the preparation of films from solutions of the copolymer of the present invention a high production commercial solvent-casting machine resembling a Fourdrinier paper machine in general layout may be used. The copolymer solution can be distributed onto a moving, endless, flexible, polished stainless steel belt which is heated. The solvent is evaporated and a sheet still containing solvent is run from the belt around heated drums to complete the drying. In the laboratory a large variable temperature electric hot plate and polished stainless steel plate may be used. The polymer solution is evenly distributed with a spreader and partially dried on the hot plate at a selected temperature. Drying may then be completed in an oven.

In the following illustrative examples the amounts of the various ingredients are expressed as parts by weight unless otherwise indicated.

*Example I*

The following recipe was employed in the stepwise preparation of an acrylonitrile-tetramethylene diacrylate copolymer:

| | Parts |
|---|---|
| Acrylonitrile | 100.0 |
| GAFAC RE-610 [1] (emulsifier) | 3.5 |
| Ammonium persulfate | 0.5 |
| Sodium metabisulfate | 0.23 |
| t-Dodecyl mercaptan | 0.5 |
| Tetramethylene diacrylate | 0.5 |
| Water | 400.0 |

A mixture of

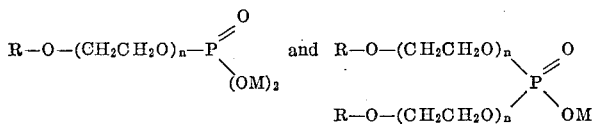

more fully described above.

Most of the water (370 parts) and all of the emulsifier were placed in the polymerization reactor and the mixture was stirred and heated to 60° C. and was then purged with nitrogen to remove oxygen. The ammonium persulfate in 15 parts of water and the sodium metabisulfate in 15 parts of water were then added to the mixture. The t-dodecyl mercaptan was then added followed by all of the tetramethylene diacrylate and 0.5 parts of acrylonitrile. Polymerization started at once and was allowed to continue for from 20 to 30 minutes at 60° C. at which time substantially all of the monomers had been converted to polymer. At the end of this time, the remainder of the acrylonitrile was added continuously over a three-hour period through a dropping tube. After all the acrylonitrile had been added, the reaction was allowed to continue for an additional hour. At the end of the reaction, the mixture was cooled and the polymer was isolated by filtration, was washed to remove catalyst residues and emulsifier, and was dried.

A solution of 15% by weight of the copolymer prepared in the foregoing manner was prepared in dimethyl formamide. The mixture was prepared at room temperature, the container was closed and the polymer was allowed to dissolve with occasional shaking at about 70° C. The resulting solution was filtered through a 140 mesh stainless steel screen and the filtrate was used in the preparation of a cast film.

A film was prepared by pouring some of the filtrate from above onto a stainless steel plate and a calibrated draw-bar was then used to distribute evenly the solution on the plate to a thickness of 7.5 mils. The plate was then heated on a hotplate at 90–100° C. in a hood for from about 15 to 20 minutes. The essentially dry film was then stripped from the stainless steel plate and dried in an oven for a few minutes at about 100° C.

The dry film was found to have the following physical properties:

Tensile strength _____ 9,170 p.s.i. (ASTM).
Ultimate elongation _____ 6.2% (ASTM).
Molecular weight _____ 100,000 (light scattering).

A repeat of the foregoing procedure wherein the main part of the polymerization reaction was carried out under reflux produced a polymer having a molecular weight of 42,500 which was very soluble in dimethyl formamide and formed excellent cast films which were strong and flexible. Molecular weight determination was made by conventional light scattering techniques.

When the foregoing procedure was repeated using no acrylonitrile in the first polymerization step, a polymer was obtained in 98% conversion which formed a pourable solution at about 10% solids in dimethyl formamide but films cast from this solution were extremely brittle and of little value.

When the foregoing procedure was repeated using a single step batch polymerization of 50 parts acrylonitrile, 50 parts tetramethylene diacrylate and 0.5 parts t-dodecyl mercaptan a polymer was obtained which was completely insoluble in dimethyl formamide as well as other polar solvents which are known to dissolve polyacrylonitrile.

Example II

The procedure of Example I was repeated using an overall monomer charge of 0.5 part of tetramethylene diacrylate, 50 parts of acrylonitrile and 50 parts of methacrylonitrile. The tetramethylene diacrylate and 0.5 part of acrylonitrile were used in the seed step. The modifier used was 0.25 part of t-dodecyl mercaptan. A polymer resulted in about 88% conversion which formed a pourable solution at 15% solids in dimethyl formamide. Films cast from this solution according to the procedure of Example I were tough, flexible and did not embrittle upon aging for extended periods of time at room temperature. Similar results were obtained when no t-dodecyl mercaptan was used in the polymerization recipe.

Example III

The procedure of Example 1 was repeated except that methacrylonitrile was substituted for acrylonitrile and 0.25 part of t-dodecyl mercaptan were employed. 0.5 part of tetramethylene diacrylate and 0.5 parts of methacrylonitrile were used in the seed step. The polymer was prepared in 100% conversion and it formed a pourable 20% solids solution in dimethyl formamide. A film cast from this solution by the procedure given in Example I was tough, flexible and did not embrittle upon aging.

Example IV

A series of polymers were prepared according to the two step procedure of Example I employing the following recipe:

| | Parts |
|---|---|
| Water | 400 |
| Sodium lauryl sulfate | 5.0 |
| Sulfuric acid (0.1 N) | 20 |
| Acrylonitrile | 99.5 |
| Ammonium persulfate | 0.5 |
| Sodium metabisulfate | 0.2275 |
| t-Dodecyl mercaptan | 1.0 |
| Tetramethylene diacrylate | Variable |

The polymerization temperature was 65° C. In the first polymerization step 0.5 part of acrylonitrile and all of the tetramethylene diacrylate were present in the polymerization mixture. In the second step the remaining acrylonitrile was added incrementally. The resulting polymers were isolated, dried and dissolved in dimethyl formamide and films were cast. The results of these experiments are shown in Table I.

TABLE I

| First Polymerization Step, Mole Ratio Acrylonitrile/Tetramethylene diacrylate | Polymer [1] Molecular Weight | Film Properties | |
|---|---|---|---|
| | | Tensile Strength, p.s.i. | Ultimate Elongation, Percent |
| 4/1 | 282,450 | 7,500 | 1.5 |
| 4/1 [2] | 170,300 | 8,780 | 2.3 |
| 4/1 | 42,500 | 9,630 | 6.9 |
| 4/1 | 100,000 | 9,710 | 6.2 |
| 4/1 | 106,490 | 8,050 | 6.7 |
| 10/1 | 79,900 | 8,140 | 4.5 |
| 15/1 | 71,500 | 3,500 | 1.4 |
| 1/0 | 129,000 | Tore | Brittle |
| 1/1 | 140,650 | 7,310 | 6.05 |
| 5.3/1 | [3] | 9,400 | 3.0 |
| 5/1 | 574,000 | 8,775 | 3.05 |

[1] Determined by light scattering techniques.
[2] The tetramethylene diacrylate was replaced with ethylene dimethacrylate.
[3] Not determined.

Example V

The procedure of Example IV was followed using a constant mole ratio of acrylonitrile to tetramethylene diacrylate of 4:1. The variables studied were the effect of the amount of polymer produced (or monomer charged) in the first polymerization step and the amount of tetramethylene diacrylate used. The results are given in Table II.

TABLE II

| Monomer Charged in First Step, percent of Total Monomer | Molecular Weight of Polymer | Film Properties | |
|---|---|---|---|
| | | Tensile Strength, p.s.i. | Ultimate Elongation, percent |
| 1 | 100,000 | 9,710 | 6.2 |
| 2 [1] | 244,000 | 9,100 | 3.9 |
| 4 | 249,100 | 8,200 | 4.3 |

[1] This film had a tensile strength of 8,900 p.s.i. and an ultimate elongation of 3.5% after aging at 72° F. for 14 days.

Example VI

The procedure of Example I was repeated using various polyalkenyl monomers as shown in Table III. The acrylonitrile-ethyl acrylate copolymer appearing in Table III is a control demonstrating that a polyalkenyl comonomer is necessary in the seed step and that a monoalkenyl monomer does not function in the same manner. Similarly, the last polymer appearing in Table III is a control which was prepared by the gradual addition in one step of a mixture of 0.5 part tetramethylene diacrylate and 100 parts of acrylonitrile to the polymerization reaction. A gelled polymer was obtained also when a single step batch polymerization was carried out using 0.5 part of tetramethylene diacrylate and 100 parts of acrylonitrile. It can be seen that such a procedure (no seed step) leads to a highly gelled polymer which cannot be used in the solvent casting of films.

TABLE III

| Comonomer Used with 100 Parts Acrylonitrile | First Polymerization Step, Mole Ratio Acrylonitrile/ Comonomer | t-Dodecyl Mercaptan, Parts | Polymer Yield, Percent | 15% Dimethyl Formamide Solution Properties | Film Properties |
|---|---|---|---|---|---|
| Ethylene dimethacrylate, 0.5 parts. | 21/1 | 0.75 | 85 | Fluid | Flexible, Strong. |
| Triethylene glycol dimethacrylate, 0.74. | 21/1 | 0.5 | 95 | do | Do. |
| Tetraethylene glycol dimethacrylate, 0.78. | 21/1 | 0.5 | 79.3 | do | Do. |
| Divinyl Benzene, 0.31 | 75.5/1 | 0.75 | 82 | do | Do. |
| Diallyl Maleate, 0.23 | 4/1 | 1.0 | 89 | do | Do. |
| Allyl Acrylate, 0.26 | 4/1 | 1.0 | 89 | do | Do. |
| Ethyl Acrylate, 0.5 | 2/1 | 1.2 | 82 | do | Brittle, No strength. |
| Divinyl Butane Diol, 0.335 | 4.3/1 | 0.5 | 85.7 | do | Flexible, Strong. |
| Tetramethylene Diacrylate, 0.5 [1] | | 0.5 | 77 | Gelled, Solid | Film could not be cast. |

[1] Single step continuous addition of monomer mixture.

Example VII

A. An acrylonitrile/tetramethylene diacrylate copolymer was prepared by the procedure of Example I with the exception that 5 parts of sodium lauryl sulfate were used as the emulsifier and 1.0 parts of t-dodecyl mercaptan was employed.

B. The procedure of A (above) was repeated except that no tetramethylene diacrylate was used and 0.5 part of acrylonitrile was used in the first polymerization step.

Solutions of polymers A and B (15% by weight) were prepared in dimethyl formamide and films were cast therefrom according to the procedure of Example I. The 15% solutions of A and B were fluid and had about the same viscosity. The films which resulted from the casting of solutions of A and B were aged at 25° C. and the change in properties from the initially formed films were noted (Table IV).

TABLE IV

| Polymer | Unaged | | Aged 11 Days | | Film Became Brittle, Days at 25° C. |
|---|---|---|---|---|---|
| | Tensile, p.s.i. | Elongation, percent | Tensile, p.s.i. | Elongation, percent | |
| A | 7,600 | 9.7 | 10,520 | 5.5 | >14 |
| B | 6,810 | 4.1 | 3,400 | 4.1 | 5 |

We claim:

1. A method for preparing a film-forming and fiber-forming resinous copolymer comprising
    (A) copolymerizing in the presence of from 0.05 to 10% by weight based on the total weight of monomers employed of a free radical polymerization catalyst from 5 to 0.05 part by weight of at least one polyalkenyl monomer having at least two $CH_2=C<$ groups per molecule separated by at least one other group, with no more than 50 parts by weight of at least one alpha, beta-monoolefinically unsaturated nitrile monomer having from 3 to 4 carbon atoms and a terminal $CH_2=C<$ group until substantially all of the monomers are converted to polymer and then
    (B) polymerizing at least 50 parts by weight of additional nitrile monomer onto (A) until a final conversion of from 70 to 100% of monomers to polymer is reached and then recovering the resinous copolymer product.

2. A method for preparing a film-forming resinous copolymer comprising
    (A) copolymerizing in an aqueous medium at a temperature in the range of from 30 to 100° C. in the presence of from 0.1 to about 3% by weight based on the total weight of monomers employed of a free radical polymerization catalyst and an emulsifier from 3 to 0.1 parts by weight of at least one polyalkenyl monomer having at least two $CH_2=C<$ groups per molecule, said groups being separated by at least one other group, with up to about 30 parts by weight of at least one alpha, beta-olefinically unsaturated nitrile monomer having from 3 to 4 carbon atoms and a terminal $CH_2=C<$ group until substantially all of the monomers are converted to polymer and then
    (B) polymerizing at least 70 parts by weight of additional nitrile monomer onto (A) until a final conversion of from 70 to 100% of monomers to polymer is reached and then recovering the resinous copolymer product.

3. The method of claim 2 wherein the nitrile monomer is acrylonitrile.

4. The method of claim 2 wherein the nitrile monomer is methacrylonitrile.

5. The method of claim 2 wherein the nitrile monomer is a mixture of acrylonitrile and methacrylonitrile.

6. The method of claim 3 wherein the polyalkenyl monomer is tetramethylene diacrylate.

7. The method of claim 3 wherein the polyalkenyl monomer is triethylene glycol dimethacrylate.

8. The method of claim 3 wherein the polyalkenyl monomer is ethylene dimethacrylate.

9. The method of claim 3 wherein the polyalkenyl monomer is divinyl benzene.

10. The method of claim 4 wherein the polyalkenyl monomer is tetramethylene diacrylate.

11. The resinous copolymer composition resulting from the method of claim 1.

12. The resinous copolymer composition resulting from the method of claim 10.

13. A method for preparing a strong, flexible film comprising
    (I) forming a solution by dissolving in a volatile, polar solvent a dry, resinous copolymer resulting from
        (A) copolymerizing in the presence of from 0.05 to 10% by weight based on the total weight of monomers employed of a free radical polymerization catalyst from 5 to 0.5 parts by weight of at least one polyalkenyl monomer having at least two $CH_2=C<$ groups per molecule, said groups being separated by at least one other group, with up to about 30 parts by weight of at least one alpha, beta-olefinically unsaturated nitrile having from 3 to 4 carbon atoms and a terminal $CH_2=C<$ group until substantially all of the monomers are converted to polymer and then
        (B) polymerizing at least 20 parts by weight of additional nitrile monomer onto (A) until a final conversion of from 70 to 100% of monomer to polymer is reached and then
    (II) casting a film from the solution of (I), allowing the solvent to evaporate from the film and recovering the substantially solvent-free film.

14. The method of claim 13 wherein the solvent is dimethyl formamide.

15. The method of claim 14 wherein the nitrile monomer component is acrylonitrile.

16. The method of claim 14 wherein the nitrile monomer is methacrylonitrile.

17. The method of claim 15 wherein the polyalkenyl monomer component is tetramethylene diacrylate.

18. The method of claim 16 wherein the polyalkenyl monomer component is triethylene glycol dimethacrylate.

19. The strong, flexible film resulting from the method of claim 13.

References Cited by the Examiner

UNITED STATES PATENTS

| | | | |
|---|---|---|---|
| 2,649,434 | 8/1953 | Coover et al. | 260—85.5 |
| 2,912,418 | 11/1959 | Johnson et al. | 260—85.5 |
| 2,980,635 | 4/1961 | Davis et al. | 260—2.1 |
| 3,017,397 | 1/1962 | Fournet et al. | 260—32.6 |
| 3,057,833 | 10/1962 | Devlin | 260—85.5 |

JOSEPH L. SCHOFER, *Primary Examiner.*

DONALD E. CZAJA, *Examiner.*